US 7,782,001 B2

(12) United States Patent
Herwig et al.

(10) Patent No.: US 7,782,001 B2
(45) Date of Patent: Aug. 24, 2010

(54) METHOD FOR THE CONTROL OF DOOR AND WINDOW ADJUSTING PARAMETERS OF A DRIVEN MOTOR VEHICLE SLIDING DOOR WITH A WINDOW AND CONTROL SYSTEM FOR THE EXECUTION OF THE METHOD

(75) Inventors: Arnd Herwig, Baunach (DE); Olaf Kriese, Lautertal (DE); Stefan Franek, Grossheirath (DE)

(73) Assignee: Brose Fahrzeugtelle GmbH & Co. Kommanditgesellschaft Coburg, Coburg (DE)

( * ) Notice: Subject to any disclaimer, the term of this patent is extended or adjusted under 35 U.S.C. 154(b) by 1061 days.

(21) Appl. No.: 11/354,233

(22) Filed: Feb. 15, 2006

(65) Prior Publication Data
US 2006/0191204 A1  Aug. 31, 2006

(30) Foreign Application Priority Data

Feb. 17, 2005  (DE) ........................ 10 2005 008 311
Feb. 17, 2005  (DE) .................... 20 2005 002 959 U

(51) Int. Cl.
E05F 15/10    (2006.01)
(52) U.S. Cl. ........................ 318/470; 318/266; 318/286; 49/26

(58) Field of Classification Search .................... 318/53, 318/264–266, 286, 466–470; 49/26, 72, 49/138
See application file for complete search history.

(56) References Cited

U.S. PATENT DOCUMENTS

| | | | | |
|---|---|---|---|---|
| 6,166,508 A | * | 12/2000 | Kalb | 318/632 |
| 6,477,806 B1 | * | 11/2002 | Asada et al. | 49/169 |
| 6,966,148 B2 | * | 11/2005 | Choi | 49/360 |
| 2004/0194385 A1 | * | 10/2004 | Ichinose | 49/26 |
| 2007/0107313 A1 | * | 5/2007 | Suzuki et al. | 49/360 |
| 2007/0138832 A1 | * | 6/2007 | Kraus et al. | 296/155 |

* cited by examiner

Primary Examiner—Bentsu Ro
(74) Attorney, Agent, or Firm—Jacob Eisenberg

(57) ABSTRACT

A method for control of door and window adjusting parameters is disclosed, the method including the steps: determining at least a first door adjusting parameter and at least a first window adjusting parameter, controlling the first door adjusting parameter and a further door adjusting parameter by considering the determined first window adjusting parameter and controlling the first window adjusting parameter and a further window adjusting parameter by considering the determined first door adjusting parameter. The above steps may also be performed in the alternative. An interaction between the two moveable elements sliding door and window pane is assured. The control of further parameters can occur in dependence from the determined parameters in such way that the risk of arising injuries and in particular damages by a crush incident between a C column of the motor vehicle and the sliding door at a window opening of the sliding door is minimized.

14 Claims, 8 Drawing Sheets

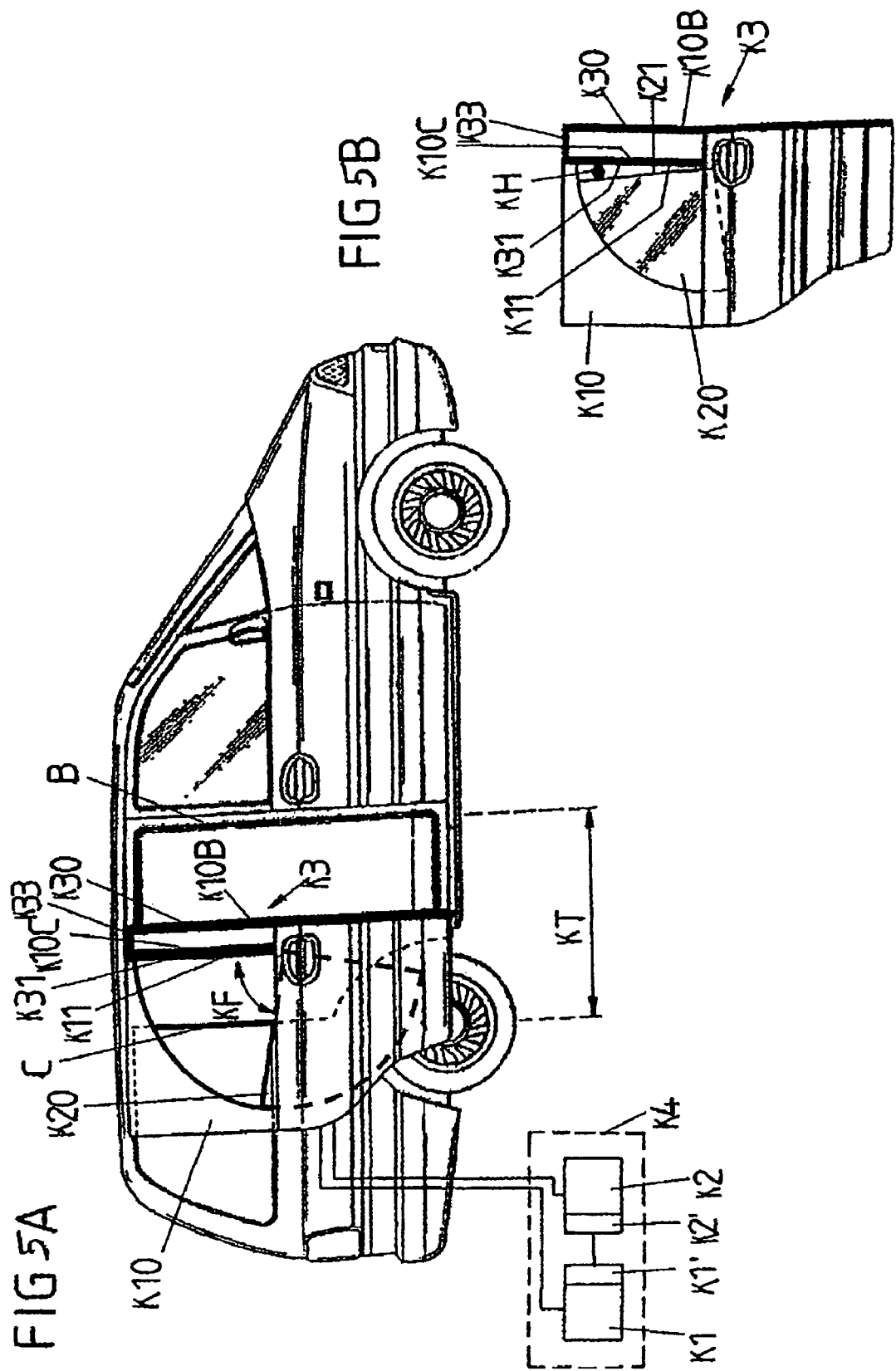

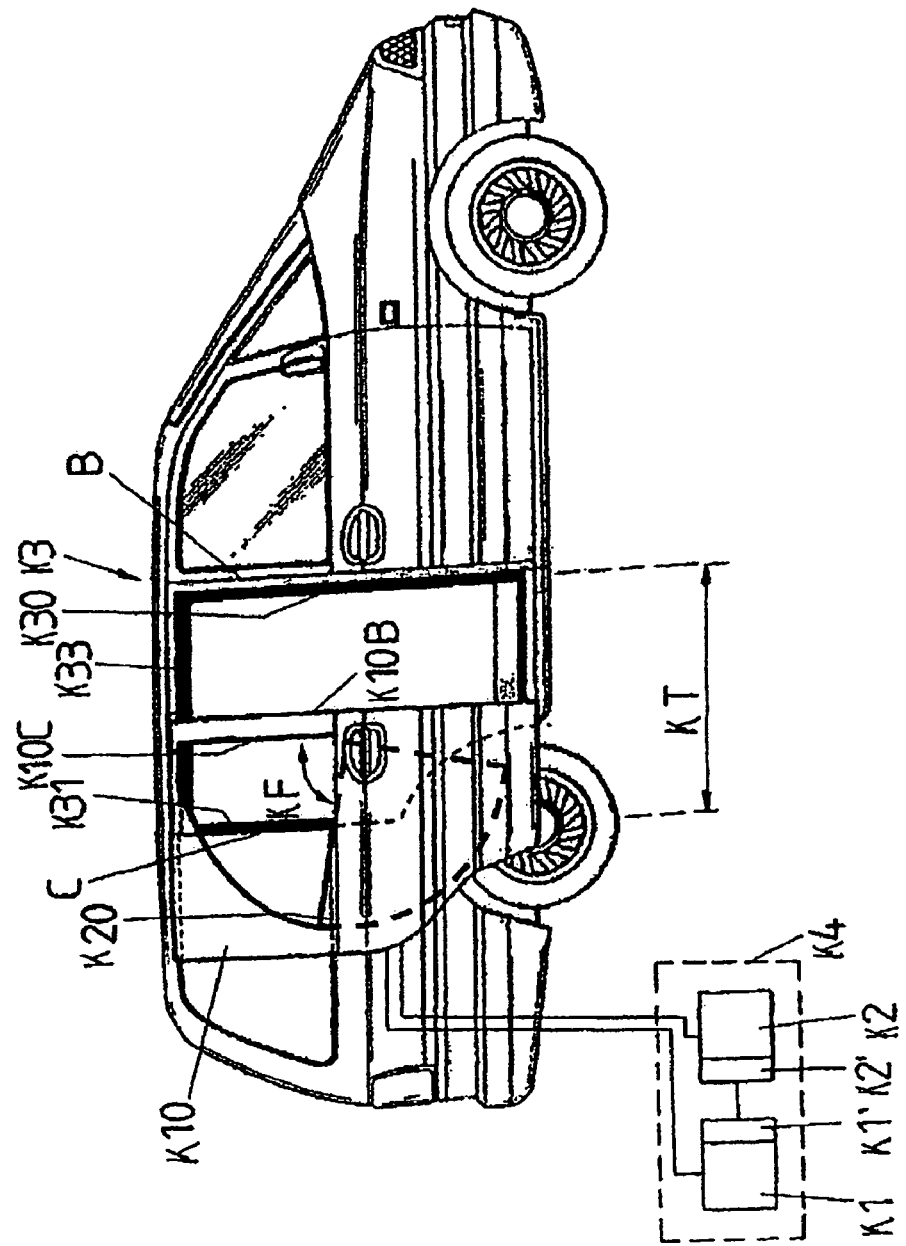

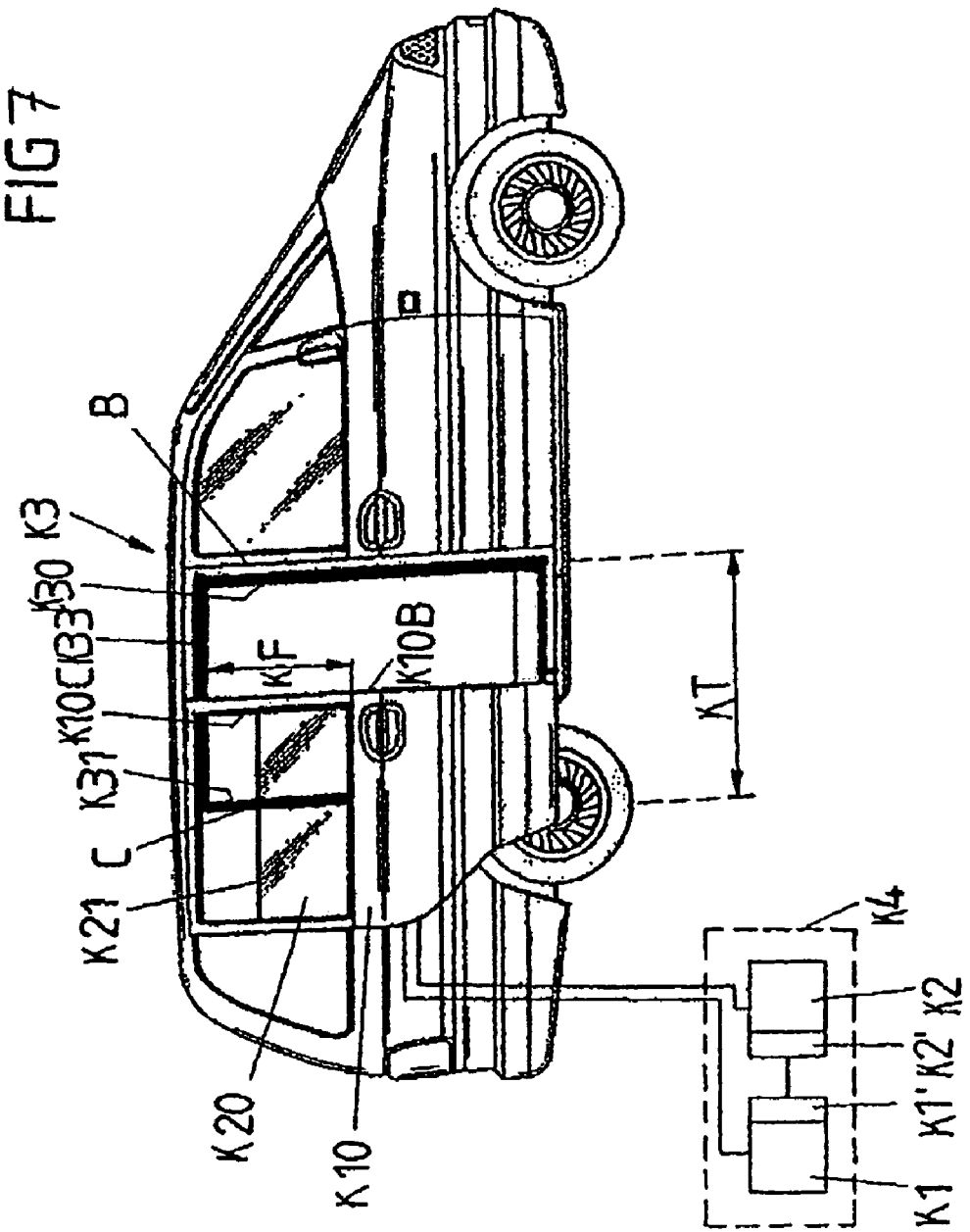

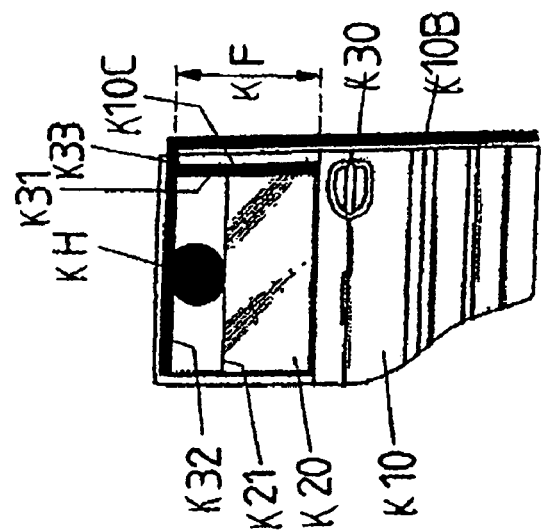
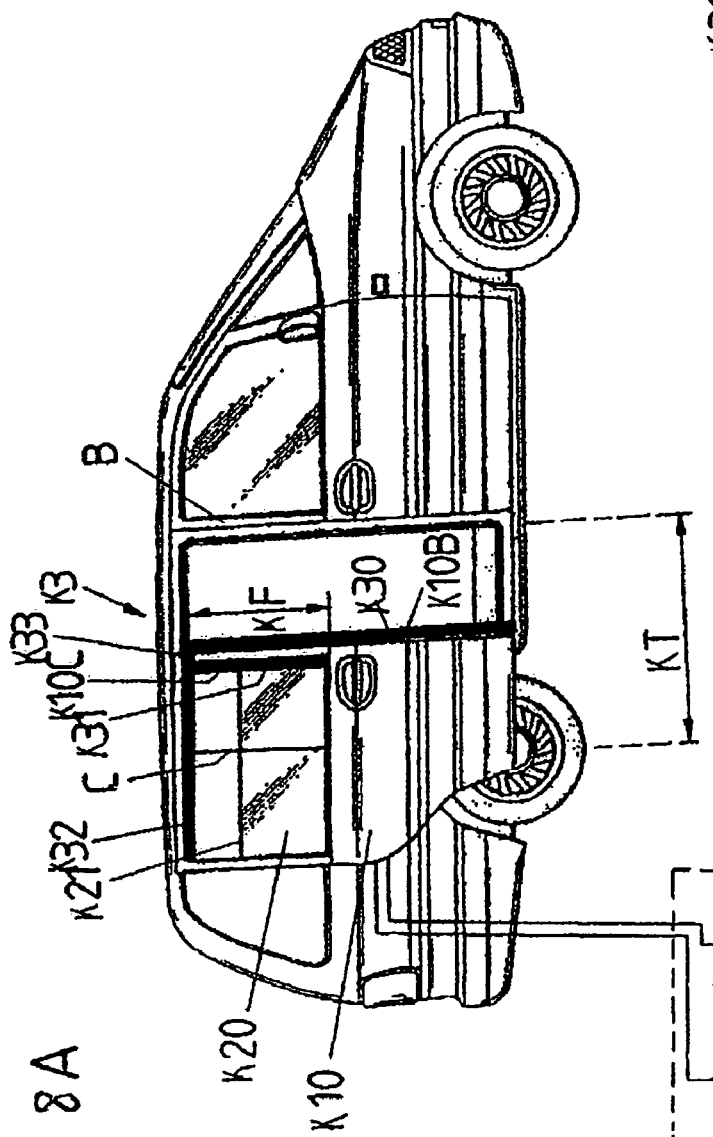

METHOD FOR THE CONTROL OF DOOR AND WINDOW ADJUSTING PARAMETERS OF A DRIVEN MOTOR VEHICLE SLIDING DOOR WITH A WINDOW AND CONTROL SYSTEM FOR THE EXECUTION OF THE METHOD

BACKGROUND OF THE INVENTION

The present invention is directed to a method for controlling door and window adjusting parameters of an actuated motor vehicle sliding door having a window located therein. Either or both of the window and door may be powered.

Increasingly, motor vehicles make use of motor drives for opening and closing sliding doors. Typically, such sliding doors are placed between B and C columns of a motor vehicle, such that, when closed, the sliding doors lock the respective motor vehicle body section.

In the present description, the motor vehicle body sections which apply to the B and C columns, placed to the vertical sliding door edges and adjacent one another at a closed sliding door, are independent of whether they are the actual B and C column of the motor vehicle. A sliding door may, for example, be located between the C and D column of a motor vehicle. It is further possible that respective windows of sliding doors and adjacent window or windows of front swinging doors are developed without a window frame, so as to preclude a B column per se. Accordingly, flexible use of the B and C column notation below along with alternative embodiments of the present invention are included within the scope of the invention.

In the prior art, a crush situation between a sliding door and the B column of the motor vehicle can only occur at the motor driven closing of the sliding door, if the window of the sliding door is closed. There are appropriate crush protection devices provided for appropriate detection.

If the window is fully or partially open, a further crush situation can occur during the opening process of the sliding door. If an object projects out from an open window or retracts into the vehicle's interior, the object is necessarily crushed between the C column of the motor vehicle and the window frame section moving towards the C columns before reaching the complete opening position of the sliding door.

Control systems for controlling vehicle sliding doors, windows and such, include sliding door control electronics for a sliding door actuation device, for the actuation of a sliding door motion along a door adjusting range; window control electronics for a window control system, allocated to a sliding door, with a window pane for the motive actuation of a motion of the window pane along a window adjusting range; and a sensor system for the detection of obstacles in the window adjusting range and in the door adjusting range.

Increasingly, motive actuations, for the opening and closing of the sliding door, are used for motor vehicles with sliding doors. Generally, such sliding doors are installed in the section between the B and C columns of a motor vehicle, in such a way that they close a vehicle's section of the motor vehicle between its B and C column. The vehicle's section is thereby defined by two essentially vertically running closing edges of the sliding door.

Sliding doors may further be installed in mini-buses between their C and D columns. It is further possible that the window of the sliding door and a front and/or rear window adjacent to it are configured without a window frame or with a relatively small window frame so as to preclude conventional B and/or C columns. However, a B and in particular C column with regard to the present invention is still allocated to the sliding door, namely, in the form of the vehicle's sections adjacent to the front respective back closing edges.

With the traveling element in the form of a window pane on the adjusting range of the motor-driven sliding door, new risks arise regarding potential crush incidents in the window and in particular in the door adjusting range.

SUMMARY OF THE INVENTION

The present invention is directed to a method and control system therefore which provide increased crush protection and overall increased safety against the above described dangers associated with sliding doors and windows. An additional feature of the present invention is its relative simplicity thereby facilitating flexible application and reduced costs.

The present invention comprises a method of controlling at least one of door adjusting parameters of a driven motor vehicle sliding door and for controlling at least one of window adjusting parameters of a traveling window pane of the motor vehicle sliding door, the method comprising the following steps: determining at least one of the door adjusting parameters, determining at least one of the window adjusting parameters, and performing at least one of the following method steps: controlling at least one of the door adjusting parameters in dependence of the at least one of the determined window adjusting parameters, and controlling at least one of the window adjusting parameters in dependence of the at least one of the determined door adjusting parameters.

Accordingly, the interaction between the power door and window are assured. Based upon the determined parameters, control of further parameters are possible such that the danger of a crushing incident, at the window opening, involving the window, door and/or frame, is reduce.

The aforementioned parameters relate to variable travel related elements, such as: position, rate of motion, acceleration, and moment. Additional possibilities include the power with which the power door or window is moved, regulating distances and the like.

Still further parameters include surrounding environment based parameters, such as: temperature, mechanical vibrations, regional situation of the motor vehicle, speed of the motor vehicle, and the like. Characteristics of the control signals for a motor actuation of the door and/or window pane are also considered as a regulating distance parameter.

Preferably, parameter sections are allocated to the determined first regulating distance parameters after the first method step of the determination of the first regulating distance parameter. Subsequently, the determined first regulating distance parameters are compared with allocated parameter sections for generating a comparative result and control of the first and/or further regulating distance parameter(s) which then occur depending upon the generated comparative result. For example, threshold sections in the form of allocated parameter sections can be converted in such a way that a determined first door adjusting parameter for the safety protection requires that a defined window adjusting parameter is placed outside a defined parameter interval. The parameter intervals can be defined by a fuzzy logic.

Accordingly, the allocation of a door adjusting parameter section may be carried out in dependence of the determined first window adjusting parameter and the allocation of a window regulating distance section in dependence of the determined first door adjusting parameter.

In an embodiment of the present invention, window position on a regulating distance between a fully opened window starting position and a fully closed window target position is determined as a first window adjusting parameter. A path length, according to the execution of the allocated window lifting system may serve as an adequate parameter—at essentially translational movement of the window pane—or a swing angle—at essentially rotatory movement of the window pane. A critical door position section, where the sliding door should not be placed from the determined window position because of security reasons, is allocated for each determinable window position.

However, if the sliding door is still in the critical door position interval, then at least one of the door motion parameters is changed. This can be realized by a braking of the door speed and/or in a highly reduced regulation of door power.

It is accordingly advantageous to determine the door position between a fully opened door starting position and a fully closed door target position as first door adjusting parameter. An allocated critical window position interval, namely, a position where the window should not be because of security reasons during a traveling motion of the sliding door, exists for each determinable door position. If this is still the case, at least one window adjusting parameter is changed. This can be particularly realized by a modification of the window position and/or as a decelerated or decelerating motion of the window pane and/or downgrading the window regulation moment.

The present method is developed in a preferred variant in such a way that the regulating motion of the window pane during a closing motion of the sliding door is controlled in such a way that the window pane also moves into a closing position if the window pane is powered by a motive window lifting system. Accordingly, it is automatically avoided that the window pane arrives at a critical window opening interval during the closing motion of the sliding door.

In another embodiment of the present invention, a warning signal is provided in the form of an acoustic warning message which is generated in order to request the closing of the window pane or as a warning for a crush risk if the window pane and/or the sliding door are in an allocated parameter section.

According to the present invention, a first control system comprises a window lifter control system for a motor-driven window lifter device in a motor vehicle sliding door, a sliding door control device for a motor-driven motor vehicle sliding door system and a communication device which enables the data transfer between the window lifter control system and the sliding door control system. The window lifter control device and the sliding door control device are developed and installed in such a way that they determine the window adjusting parameters of the window lifter system and the door adjusting parameters of the motor vehicle sliding door system and that window adjusting parameters and door adjusting parameters can be so controlled interdependently. The interdependent control of the regulating distance parameters are discussed above and may span several different embodiments.

In still another embodiment, the communication device is part of a motor vehicle data bus system such as for example a controller area network, flex ray and media oriented system transport.

The present invention may further include a second control system which comprises, a common control device for a motor-driven window lifter system in a motor vehicle sliding door and for a motor-driven motor vehicle sliding door system, whereby the control device is developed and installed in such a way that it determines window adjusting parameters of the window lifter system and door adjusting parameters of the motor vehicle sliding door system and further controls interdependently window adjusting parameters and door adjusting parameters. The interdependent control of the regulating distance parameters may further comprises all the previously presented embodiments of methods.

A further object of the present invention is directed to making a control system for a motor vehicle sliding door or power door with an adjustable window pane available, the system oriented towards improved safety against crush incidents.

According to the present control system, adjustment to the motion of the power door after detection of an obstacle in a window adjusting range and/or modification of the motion of the window pane after the detection of an obstacle in the door adjusting range is effected.

Such motion modifications and/or adjustments may include: complete stoppage, reversal and general speed reduction. An additional feature of the present control system is a coupling of the motion modification (such as reduction of the motion speed) with a modification of the actuation force active on the respective adjusted element.

If the window is fully or partially opened, the following crush incident can occur during the opening process of the sliding door. If an object protrudes from the opened window, and in particular projects from the outside into the vehicle's interior, then the object is necessarily crushed between the C column of the motor vehicle and a window frame section of the power door moving towards the C column before reaching the fully opened position of the sliding door.

The sensor system may preferably include a B sensory device and a C sensory device. The B sensory device is arranged to detect obstacles located along the power door movement range and between the sliding door and the B column of a motor vehicle in particular. The C sensory device is arranged to detect obstacles located along the power door movement range between the sliding door and the C column of a motor vehicle.

According to an embodiment of the present invention, the B and/or C sensory device(s) may be room monitoring sensory device(s). The sensory devices are further arranged such that a threatening or pending crush incident is recognized by the sensor monitoring of the room wherein the arrangement of objects representing a source of danger are located. For this purpose, the sensors may be image-producing sensors. Appropriate software may further be used to support the sensors.

In another embodiment, the B and/or C sensors may be touch-sensitive sensors arranged along a perimeter of the sliding door and/or motor vehicle body proximate to where a crushing event may occur. The perimeter may not solely be the boundary edges of the sliding door but also the boundary edges of the adjacent motor vehicle body sections. In addition, the window frame edge resulting from an at least partially opened window, which moves during its opening motion towards the C column, may represent a clamping edge.

In comparison to the room monitoring, a crush incident at touch sensitive sensory devices is detected by a physical touch between object and touch sensitive elements.

In a still further embodiment, a combination of sensor type is possible. For example, the in relation to the various possibilities of combinations described herein below between sensory devices operating between the side of the motor vehicle body and the door, the room monitoring and touch sensitive functionality of the sensory devices is combinable.

A feature of the present invention is that a B and in particular a C sensor are arranged on either side of the motor vehicle body and/or door for detecting a jamming of an object between B column and sliding door (B-jam) as well as a jamming of an object between C column and the sliding door (C-jam).

A further feature of the present invention is to provide B and C sensors as B-C sensor. A worker can assemble the sensor as an assembly unit, with few working steps, on the side of the motor vehicle body, along the opening edges of a sliding door, opening of the motor vehicle body, or along the side of the door. The sensor offers extensive crush protection with simple assembling. Such an assembly unit may include a touch sensitive B-C-sensor with a single long out-stretched sensor element. The sensor extends between the clamping edges relevant for the B and C jamming case as well as along the connecting sections running between the clamping edges so that the B-C sensor can be developed as a one piece unit.

For an essentially rotatory and lowerable window pane which closes with a boundary edge orientated towards the B column of the motor vehicle against a sealing section of the sliding door, the C sensor on the side of the door can preferably be positioned along the sealing section and serve at the same time as a crush protection sensor of the window lifter system.

For an essentially translatory and lowerable window, pane which moves into a sealing section of the window pane during the closing, a window sensor operating as crush protection sensor of the window lifter system is provided which is developed in one piece with the B-C-sensor.

These two previously described variants guarantee a particularly budget-priced realization of the control system, especially at a development in one piece with the B-C-sensor, because the functionality of the crush protection is guaranteed for objects in the window adjusting range as well as for objects in the door adjusting range.

Especially simply built touch sensitive sensors are developed in such a way that an electrical touch is generated during a jamming case which occurs by the mechanical interaction with the object detected as an obstacle.

In another embodiment of the present invention, the touch sensitive sensor is developed and installed in such a way that surface waves run along a sensor medium installed on the clamping edge to a receiving device. During mechanical interaction between the sensor medium and an obstacle, a reflection and/or damping of the surface waves is detected by the respective receiving device.

In still another embodiment of the present invention, the touch sensitive sensor is developed as a sensor effecting a mechanical interaction in an event of a jam case thereby leading to a modification of a particular electromagnetic field. Such can be affected by a capacitive or inductive construction or by the use of an ultrasound field.

The control and sensor system may be further arranged such that obstacles in the power door movement range and/or different detection areas are distinguished and otherwise determined. At a very least, a B column section in the area between the sliding door and B column of a motor vehicle and a C column section between the sliding door and C column of the motor vehicle can preferably be distinguished. In this way, the control system can react, depending on whether it is a B or a C jamming case, and control the movement of the sliding door or window accordingly.

In a further embodiment, the sensor system is arranged such that positions representing obstacle detection locations along the extension of the B and C column sections can be detected. This may be realized, for example, through a measurement of the travel time of reflected surface waves or a spatially resolved configuration of the electrical contacts.

Furthermore, the window lifter control electronics and the sliding door control electronics comprise interfaces and mediums for wireless and/or wired interactive exchange of data and for the transmission of data to other motor vehicle components. Any appropriate electrical and/or opto-electrical components may be used to facilitate data exchange. Particular examples of such components include a controller area network integrated with a local interconnect network bus system (CAN-bus/LIN-bus).

In another embodiment, the window lifter control electronics and the sliding door control electronics of the control system are arranged on a common board and built therefore as a common and/or single assembly unit.

It is advantageous if the window lifter control electronics and the sliding door control electronics are installed and developed in such a way that the positions of the sliding door and the window pane along the door adjusting range and along the window adjusting range can be determined. The determined position information can be considered during the change of the motion of the sliding door and/or the window.

Further, the control system preferably comprises a control device which compares the determined position of the sliding door with a door opening area and the determined position of the window pane with a window opening area. Depending upon the comparative result, the motion of the sliding door and in particular the motion of the window can be modified in such a way that the risk of possible jamming cases is minimized and/or reduced.

It is therefore for example possible that the control device only permits an opening motion or a closing motion of the sliding door to a defined door opening area as long as the window pane is opened beyond a critical window opening section.

BRIEF DESCRIPTION OF THE SEVERAL VIEWS OF THE DRAWINGS

Additional characteristics and advantages of the present invention are set out below and supported by the figures, wherein:

FIG. 5A depicts a first embodiment of the control system with a sensory system located exclusively on the side of the door and a rotatory traveling window pane;

FIG. 5B depicts the sliding door of FIG. 5A with the window pane being almost closed;

FIG. 6 depicts a second embodiment of the control system;

FIG. 7 depicts a schematic of a third embodiment of the control system;

FIG. 8A depicts a fourth embodiment of the control system; and

FIG. 8B depicts a sliding door depicted in FIG. 8A.

DETAILED DESCRIPTION OF THE INVENTION

Figure 1:
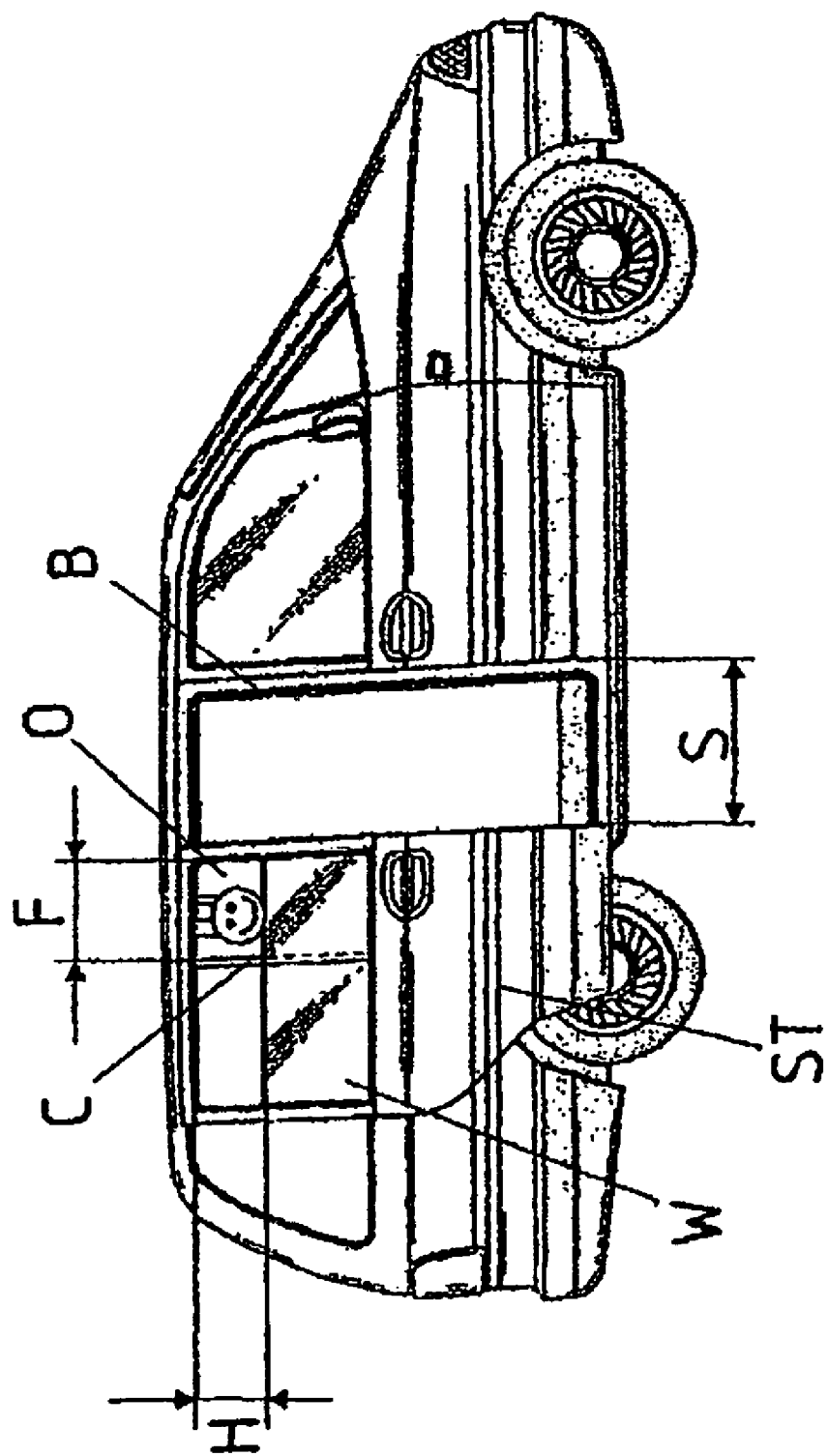
FIG. 1 depicts a side view of a motor vehicle with a sliding door located between a B and C column.

FIG. 1 depicts a side view of a motor vehicle, the motor vehicle including a sliding door ST arranged to slide between a B column B and a C column C. The sliding door ST is further arranged to slide along a range S during an opening and closing process. To affect the sliding door opening, the motor vehicle is further equipped with appropriate drive means, not shown, as would be envisioned by one skilled in the art.

The sliding door ST includes window pane W arranged to open and close along a substantially linear course H. When not completely closed, the window pane W defines an open window area O. The size of area O depends upon area values defined by course H and S with the actual usable open window area O being of an area defined in length by range F and C column C.

If the window pane W is located outside of its fully closed position, a window opening O develops. The size of the window opening O depends on the one hand on the measurement of the covered opening distance along the adjusting range H. On the other hand, the window opening O is also a function of the sliding door position along the sliding door adjusting range S. The closer the sliding door ST comes to the completely opened position, the more the C column C and the subsequent side section of the motor vehicle overlap the window. Therefore the C column C of the motor vehicle forms at each of the adjustable opened positions of the window pane a first vertical boundary edge of the window opening O. A vertical window frame section of the sliding door ST adjacent to the B column B forms the second vertical boundary edge. The first horizontal boundary edge is defined by the upper border of the window pane W. The window frame section opposing this window pane border forms the second horizontal boundary edge of the window opening O.

The distance between the first and second vertical boundary edges correspond therefore to a window opening width F of the window opening O. These two vertical boundary edges move towards each other at the opening motion of the sliding door ST, whereby the window opening width F constantly diminishes so that the intermediate window opening O becomes narrower and finally disappears altogether.

If there is an object projecting through the window opening O between the two vertical boundary edges, it will be necessarily crushed during the course of the opening motion of the sliding door ST between the C column C and the vertical window frame section as an obstacle to the opening motion. Such objects may not only be physical inanimate objects but also passenger body portions either protruding into or out from the interior of the motor vehicle. FIG. 1 depicts a passenger within the motor vehicle.

Figure 2A:
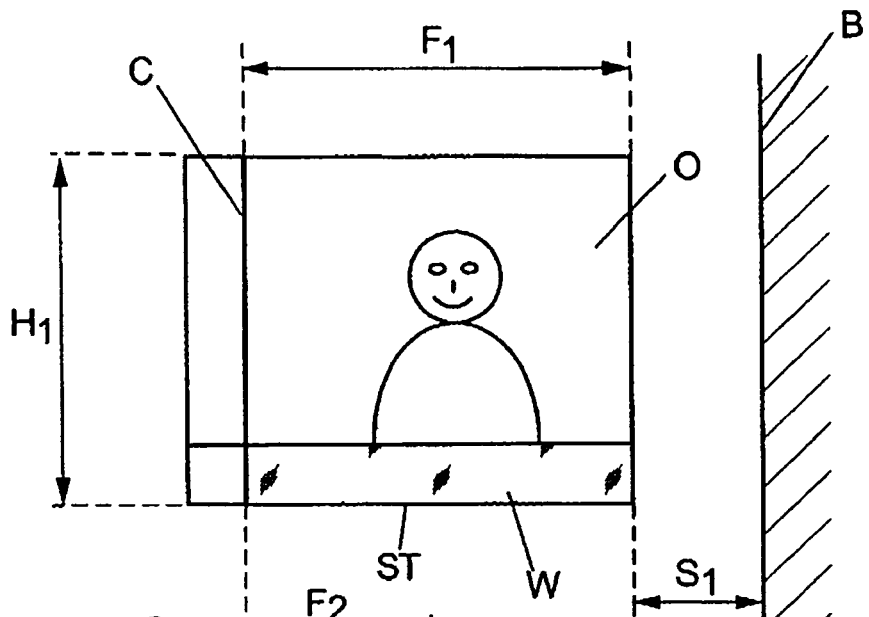
FIG. 2 depicts a schematic side view of the sliding door of FIG. 1 in three different opening positions.
Figure 2B:
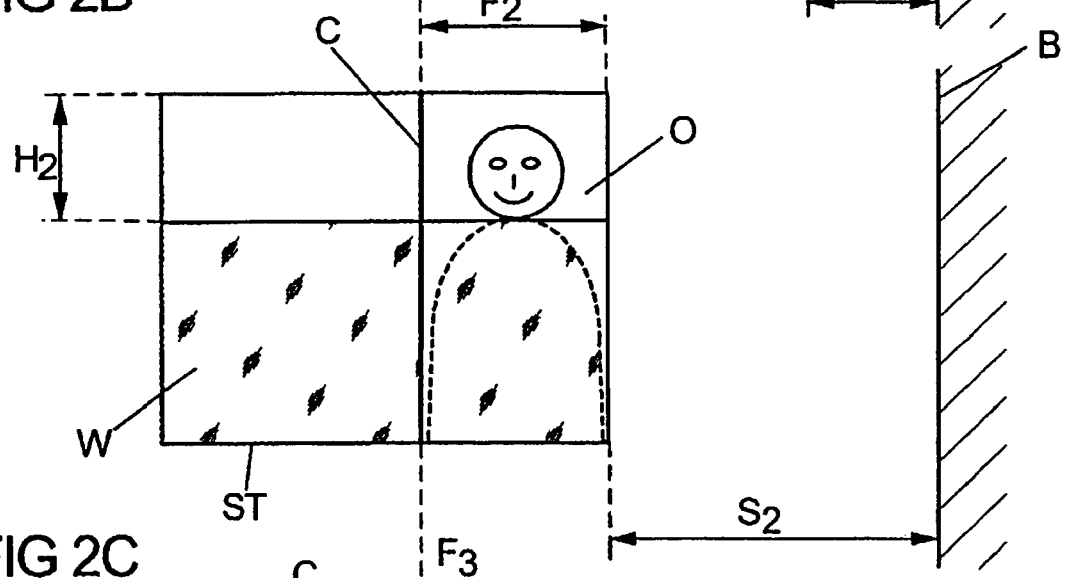
Figure 2C:
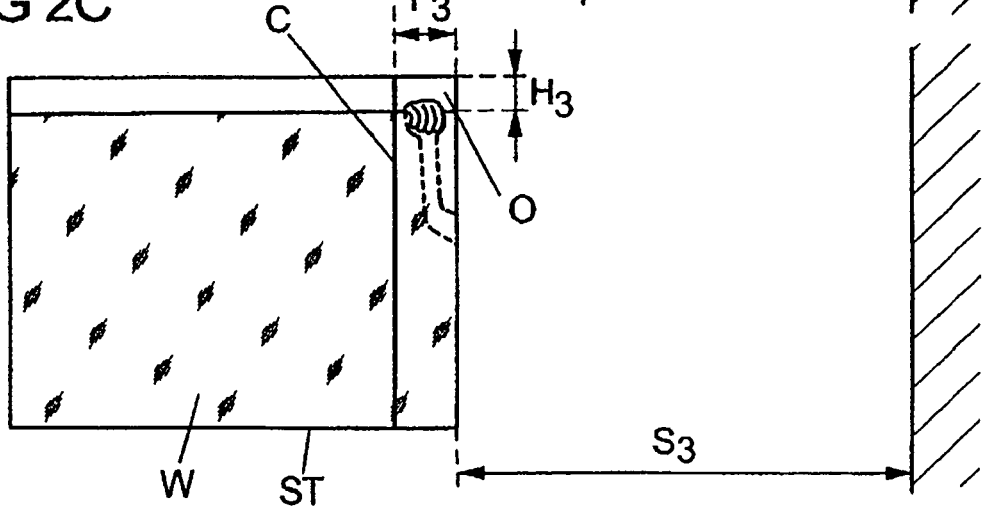

FIGS. 2A-2C depict various window and door positions with respect to the passenger inside the motor vehicle and further serve to describe the functioning of the present invention.

FIG. 2A depicts the window of a motor vehicle sliding door ST with a window pane W in an almost completely opened position whereby a window opening O is determined in a vertical direction by the window adjusting range H1. The window opening O includes in a horizontal direction the window opening width F1. The sliding door ST is located around the sliding door adjusting range S1 moved away from the C column C of the motor vehicle in a little bit opened position.

A control system allocated to the sliding door ST and the window pane W determines the positions of the sliding door ST and the window pane W along the respective adjusting ranges. The control system is informed about which horizontal and vertical measurements are shown by the window opening O with these determined regulating distance parameters. If the window pane W, as shown in FIG. 2A, is in its almost completely opened position, and the sliding door ST is only opened a little bit, the window opening O would then have comparatively large measurements. The window opening O is so large, that for example a person with the width of his upper body could lean through the window opening O (as is suggested in FIG. 2A).

A sliding door position section is then allocated to the determined sliding door position in dependence from the determined window pane position as a parameter section. This sliding door position section corresponds, as the shown per window pane position H1, to the section of an approximate and expected human upper body width. The determined sliding door position during the opening process is always compared again with the allocated sliding door position section. As soon as the sliding door ST moves into the sliding door position section, a door adjusting parameter is, for instance, modified. Many door adjusting parameters can be taken into consideration. Regarding functionality, all these modifications help increase the safety by avoiding crush incidents or help minimize the injury and in particular the damage risk.

The door speed, the door acceleration, and the turning moment laid out by the motive actuation device for the motion of the door, can be used as modifiable door adjusting parameters. The door speed can, for example, be reduced without interruption to standstill. For the user of the motor vehicle, this is an indication to examine whether a crush risk, because of protruding objects through the window opening O, exists. If a signal for the continuation of the closing process follows, the adjusting speed of the sliding door can then be raised again.

Alternatively, an audio signal may be manually triggered whenever the sliding door and/or window passes through a zone where a risk of jamming exists. The signal may be activated by a pushbutton and remain active until the opening O disappears—thereby indicating that the window is closed.

A reduction of the door velocity may also serve to allow more time for a reaction after occurrence of a jamming, for example, by a jammed person.

A reduction of the adjusting moment of the sliding door serves to minimize damages and injuries in case of a crush incident until a crush protection device cooperating with the control system and the motive actuation device of the sliding door is or can be activated.

It is also possible to modify, alternatively or cumulatively, door adjusting parameters in the form of parallel conditions of a closing motion. An optical and/or acoustic warning signal, accompanying the adjusting motion, could, for example, be generated upon entry into the allocated parameter section. It is possible to combine modification of several door adjusting parameters and to vary the modification of the door adjusting parameter within a door position section.

It is furthermore possible that a window adjusting parameter is controlled, cumulatively or alternatively, by a door adjusting parameter. This presupposes that the window pane W is adjustable and equipped with a motor-driven window lifter system.

The window position may for example be changed before or during the opening motion of the sliding door ST to reduce the crush risk. By way of an alternative, before the start of the opening motion of the sliding door ST, the window position is modified in such a way that the window pane moves into its fully closed position. It is also possible that this motion of the window pane W is parallel with the opening motion of the sliding door ST.

The position of the allocated parameter section, in the form of a door position section, depends on the determined position of the window pane W, determined as discussed above. If the window pane W is, as shown in FIG. 2B, located in window position H2, opened from the closed position by approximately a third of the entire adjusting range, another door position section for the modification of the door adjusting parameters is allocated. Because of the narrower window opening O, narrower objects—for example a head instead of an entire body—can also protrude as hindrances through the window opening O in a horizontal direction in comparison to the situation of FIG. 2A in a horizontal orientation.

The window opening in the vertical direction, as shown in FIG. 2C, is so small that only a hand or a lower arm section could fit through. The sliding door ST could therefore cover the adjusting range S3 from a closed position without modifying a door adjusting parameter because of safety reasons.

Figure 3A:
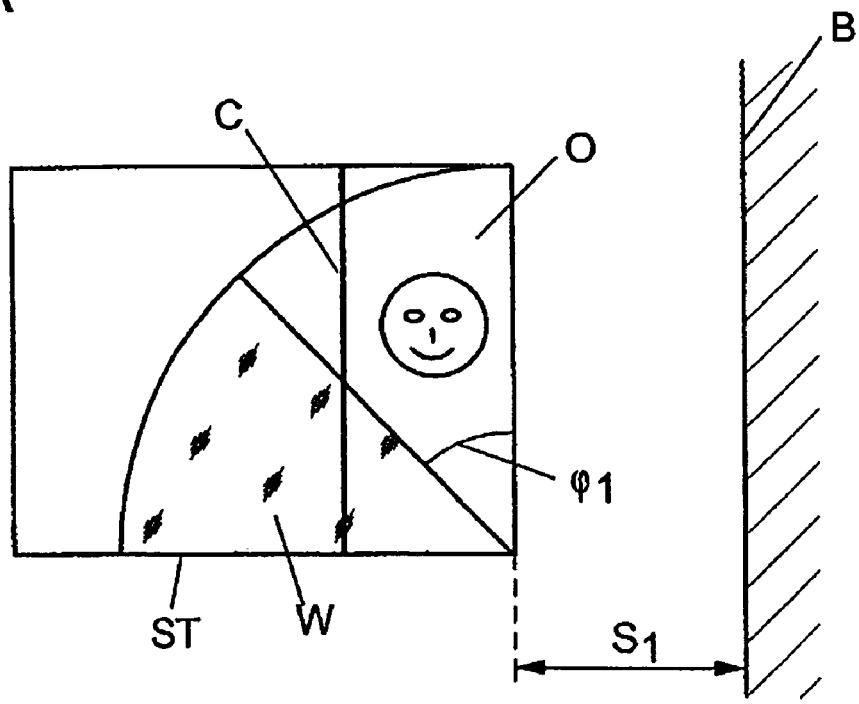
FIGS. 3a and 3b depict a schematic side view of a sliding door in two different opening positions, wherein the sliding door includes a rotatory traveling window pane.
Figure 3B:
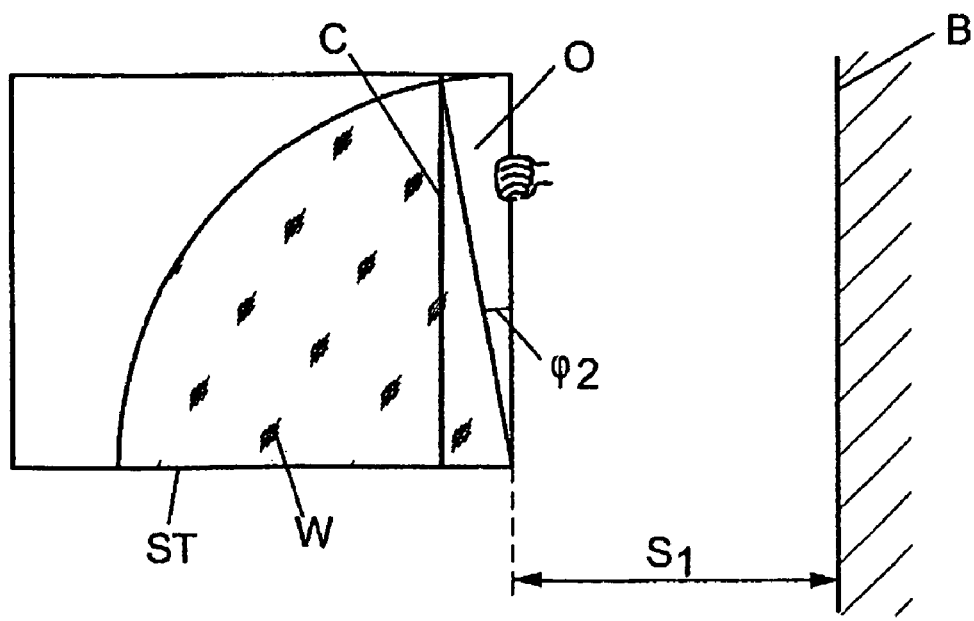

The process principle can of course also be used with motor vehicle sliding doors ST with rotatory or manually adjustable window panes W. As shown in FIGS. 3A and 3B, the window adjusting parameter is represented by opening angle φ. The window opening O defines a circle segment bordering upon C column C, of the motor vehicle, the opening being in the course of an opening motion of the sliding door ST, which does not function as a vertical limitation of the window opening O. This can, for example, be seen in FIG. 3B where the vertical range of the opening O remains substantially unchanged from that in FIG. 3A. The window opening gap O is so small that only a hand or a lower arm section could fit there-through. The sliding door ST can be opened by the adjusting range S2 without the risk of a crushing in the window opening O. A modification of a door adjusting parameter is only in the further course of the sliding door opening motion advantageous to minimize the risk of a crush incident. Reference is made to previously presented descriptions, in connection with FIGS. 2A to 2C, regarding the possible door adjusting parameters and in particular their combination.

As depicted in FIG. 3A, the C column C already forms a vertical boundary edge of the window opening O. Therefore, a situation would be reached where one or more door adjusting parameters should be modified with respect to protection against crush incidents. Accordingly, the above embodiments as discussed with respect to FIGS. 2A-2C would apply here.

Figure 4A:
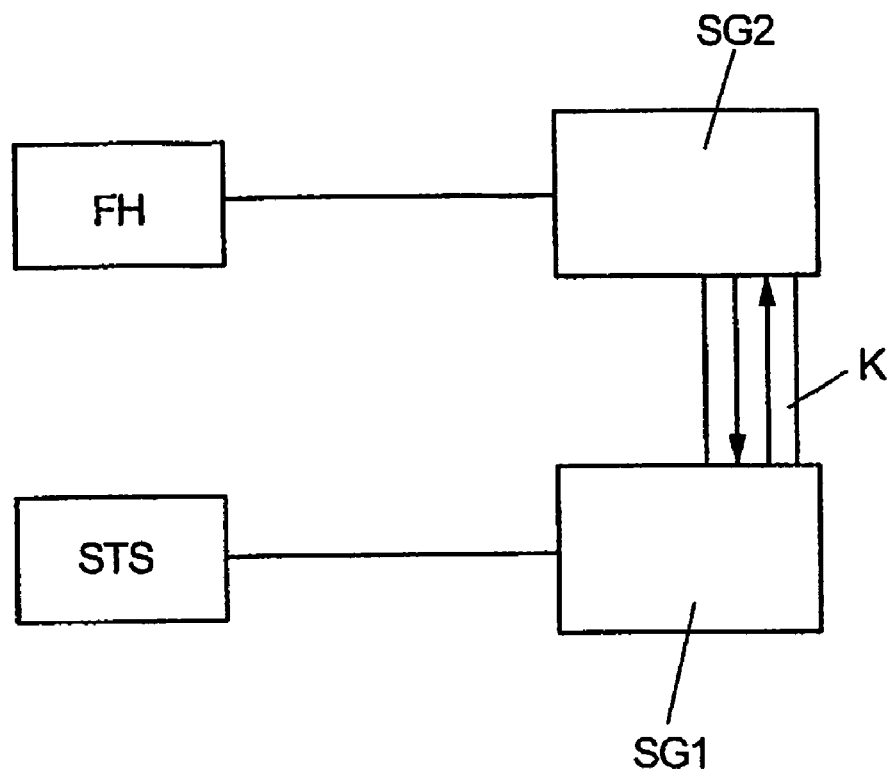
FIGS. 4a and 4b depict a schematic presentation of two control systems for the control of the motions of the sliding door and of a window pane of the sliding door.
Figure 4B:
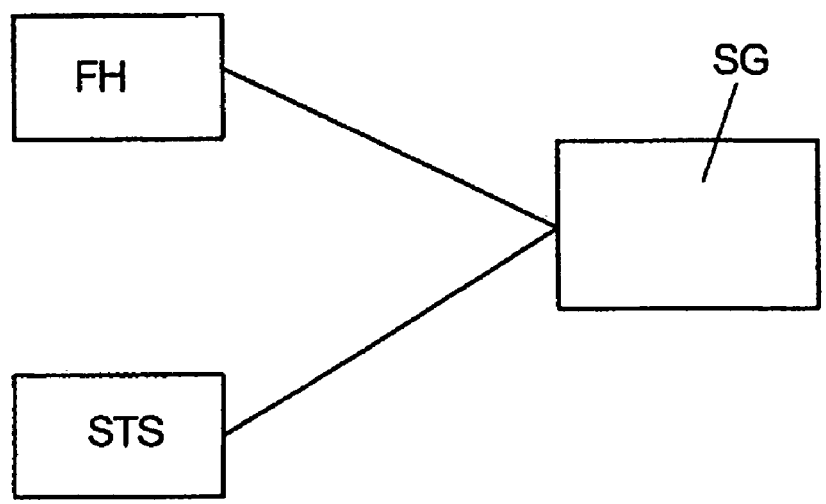

FIGS. 4A and 4B depict two variations of the present control system. In FIG. 4A, a first control device SG1 is allocated to the sliding door system STS and a second control device SG2 is allocated to the window lifter system FH. The two control devices are interactive via communication means K facilitating exchange of data and control signals. The communication device K may be a component of a motor vehicle bus system. The two control devices SG1 and SG2 include the functionality of registering adjusting parameters of the allocated components as well as interdependent control of their respective systems (FH and STS). The coupling of the existing control devices, by a data bus, enables a joint and flexible combination of different window lifter systems FH and sliding door systems STS. The two control devices can be positioned independently in various locations throughout the motor vehicle sliding door or in other parts of the motor vehicles as envisioned by one skilled in the art.

As depicted in FIG. 4B, a central control system SG may be provided, as another variation of the control system, which is developed for the control of the window lifter system as well as for the control of the sliding door system. This central control unit SG may be built with joint electronics components on a single board.

FIGS. 5A-8B depict implementation of the heretofore described invention. FIG. 5A depicts the motor vehicle of FIG. 1 with emphasis on a passenger's perspective. As depicted, sliding door K10 is located behind the passenger's front seat and positioned to facilitate access to the motor vehicle's interior. This arrangement is common to minivans and small trucks where sliding doors are increasingly replacing swinging hinged doors. While depicted as running between the B and C columns, as discussed above, the sliding door, on extended vehicles, may run between C and D columns (not shown). While the column notation corresponds to standard definitions in the motor vehicle art, the present invention is not so limited and could be applied to variations on the standard definition as would be envisioned by one skilled in the art.

FIG. 5A further depicts control system K4 in schematic form. The control system K4 comprises, sliding door control electronics K1, for a non-depicted sliding door driving device, the control electronics K1 arranged to actuate motion of the sliding door K10 along a door adjusting range KT. Secondly, window lifter control electronics K2, for a window lifter system allocated to the sliding door K10, is arranged to actuate motion of window pane K20—a component of the window lifter system along the window adjusting range KF. The control system further comprises a sensory system K3 for the detection of obstacles in the window adjusting range KF and in the door adjusting range KT.

The sliding door control electronics K1 and the window lifter control electronics K2 each comprise medium K1', K2' for the wireless and/or wired interactive exchange of data or for the transmission of data to other motor vehicles components.

The control electronics K1, K2 and the allocated data transmission medium K1', K2' can be arranged on a common board K4. The entire control electronics of the sliding door K10 can thereby be assembled as an assembly unit on the side of the door and on the side of the motor vehicle body.

According to a one embodiment of the control system and as depicted in FIGS. 5A and 5B, the window pane K20 is rotateably moveable along an essentially circular window adjusting range KF. A rotatory adjustment of the window pane K20 and therefore an essentially circular development has the advantage that less assembly space in the interior of the sliding door is required for the complete lowering than for lowering a rectangular window pane—with respect to a complete translatory lowering of the window pane K20. Accordingly, as shown in the figures, the external contour of the sliding door K10 can be adapted to the curved form of the back wheel case of the motor vehicle. The sliding door K10 can thereby be positioned closer to the rear axis of the motor vehicle without preventing the window pane from complete lowering.

In the currently described first embodiment of the present invention, the sensors of the sensory system K3 are arranged completely on the side of the door. The characteristic door-side is to be understood as the sensors K30 and K31 belonging to the sensory system K3 arranged at the sliding door K10. However, this does not exclude further components of the sensory system K3, for example appropriate evaluation electronics, from being arranged on the side of the motor vehicle of the vehicle and therefore not in the door-side.

The sensory system K3 comprises on the one hand a B sensor K30 for the detection of an object, which is at least a partially opened sliding door K10 between the B column KB of the motor vehicle and the boundary edge of the sliding door K10 facing the B column KB of the motor vehicle. The B sensor K30 extends therefore along the entire boundary edge of the sliding door K10. Such a scenario will be described as a B-crush case herein below.

On the other hand, the sensory system K3 comprises a C sensor K31 arranged to detect of an object which projects into or out of the interior of the vehicle through the opening of at least a partially opened window pane K20. The crushing of such an arranged object threatens to be an obstacle between the C column KC of the motor vehicle and a window frame section 10C facing the C column KC during an opening motion of the sliding door K10. The C sensor K31 extends therefore along the entire window frame section K10C. Such a scenario will be described as a C jamming case herein below.

A sealing section K11 of the rotatory adjustable window pane K20 also extends along the window frame section K10C. The window pane K20 moves into this sealing section K11 during the complete closing with its window closing edge K21. Because the C sensor K31 extends along the sealing section K11, the C sensor K31 also serves in the heretofore described embodiment of the control system, to detect the jamming of an obstacle KH between the window pane K20 and the window frame section K10C. The aforementioned is depicted in FIG. 5B.

B sensor K30 and C sensor K31 are developed as single pieces in the heretofore described embodiment of the control system shown in FIGS. 5A and 5B. The sensors are therefore developed as long, stretched out, preferably touch-sensitive operating, and band-like sensor elements. The sensor elements extend along the entire closing edge K10B over an intermediate section K33 leading to the window frame K10C and to the sensor section K31 along the window frame section K10C. The sensor system K3 is therefore developed in the form of a B-C-sensor which can be assembled as an assembly unit at the sliding door K10.

The sensor system K3 presents, together with the appropriate control electronics K1 and K2, a very compact control system for a motor-driven sliding door with a motor-driven window lifter. All possible jamming cases between a sliding door and motor vehicle body, and in particular between a window pane and a sliding door, can be detected. The control system initiates a modification of the motion of the window pane, and in particular, the motion of the sliding door in dependence from a detected jamming case, to minimize the injury and in particular risk of damaging jammed objects.

FIG. 6 depicts another embodiment of the control system. To avoid repetitions, only the differences to the above described embodiment(s) are presented herein below. Reference is made to the above described control system embodiment for description of common features or components.

In comparison with the first embodiment of the control system, the sensor system K3 includes, exclusively, sensors on the side of the motor vehicle body, for the detection of B and C crush cases. A B sensor K30 therefore extends along the closing edge K10B of the sliding door facing the boundary area of the B column B of the motor vehicle.

A sensor element extending along the C column KC is provided as C sensor K31. The C sensor K31 extends at least to the vertical opening width of the completely opened window pane K20.

B sensor K30 and C sensor K31 are developed according to a heretofore described embodiment as a single piece. A long-extended, preferably touch-sensitive operating, sensor element therefore runs from the B sensor section K30 along the B column KB over a horizontal intermediate section K33 to the C sensor section K31 along the C column KC. It is developed as an assembly unit which can be put especially simply into a motor vehicle body frame of the sliding door opening.

In comparison to the first form of execution, the single pieced B-C sensor does not integrate functionality to detect obstacles during the closing of the window pane K20. The window lifter control electronics K2 includes a crush protection function known from the state of the art. In cooperation with an actuator of a window lifter system, this may, for example, be realized in a time-dependant rotary moment monitoring, a ripple count, or in a comparative characteristic curve. Such crush protection of the window lifter control electronics K2 is therefore also a functional component of the sensory system K3. The crush protection operates by the control electronics with the actuating devices of window pane K20 and the sliding door K10.

It would also be possible to provide a separate window jamming sensor installed along the window frame section K10C. However, according to the embodiment depicted in FIG. 6, it is not possible to develop this window crushing sensor as a single piece in the B-C-sensor K3 on the side of the motor vehicle body. Such a window crushing sensor would then be a further separate component of the sensory system K3.

The control system may also be used for sliding doors which include an essentially translatory moveable window pane K20. Two respective embodiments are depicted in FIGS. 7 and 8A.

As above, the following describes different components to those set out in related previous embodiment(s). Reference is made to the previous embodiment(s) for description of common components. The window pane K20 is moveable by an undepicted window lifter system essentially along a window adjusting range KF.

The sensor system is developed according to the sensor system of the second embodiment depicted in FIG. 6, with B-sensor K30 and C-sensor K31 on the side of the motor vehicle body.

The sensors K30 and K31 on the side of the motor vehicle body are not appropriate to detect obstacles in the window adjusting range KF. The sensor system K3 therefore comprises a crush protection of the window lifter control electronics K2 function according to previous embodiments, as a functional component or a crush sensor developed as a separate component along the closing edge of the window frame.

Another embodiment of the control system is depicted in FIGS. 8A and 8B, with the sensors K30, K31 and K32, of the sensor system K3, arranged exclusively on the side of the door. The single piece development of the B sensor K30 and C sensor K31 corresponds to the above described embodiments depicted FIGS. 5A and 5B.

Furthermore, a window sensor K32 extends along the window frame of the sliding door K10 and along the window closing edge K21 of the window pane K20. As shown in FIG. 8B, a crushing of an obstacle KH in the window adjusting range KF can be detected by the window sensor K32.

Window sensor K32 can be preferably developed as a single piece with the B-C-sensor. The arrangement of the depicted B- and C-sensors can be varied in many ways. For example, B and in particular C sensors can be provided on the side of the door as well as on the side of the motor vehicle body.

The invention claimed is:

1. A method of controlling at least one of door adjusting parameters of a driven motor vehicle sliding door and for controlling at least one of window adjusting parameters of a traveling window pane of the motor vehicle sliding door, the method comprising the following steps:
   determining at least one of the door adjusting parameters,
   determining at least one of the window adjusting parameters, and
   performing at least one of the following method steps:
      controlling at least one of the door adjusting parameters in dependence of the at least one of the determined window adjusting parameters, and controlling at least one of the window adjusting parameters in dependence of the at least one of the determined door adjusting parameters.

2. The method according claim 1, further comprising the steps of:
   determining whether at least one of the determined door and window adjusting parameters fall within a particular predetermined one of a plurality of ranges of door and window adjusting parameters; and
   executing the step of performing in dependence of whether the determined door and window adjusting parameters fall within a particular predetermined one of a plurality of ranges of door and window adjusting parameters.

3. The method according to claim 1, wherein:
   the door adjusting parameter comprises: a door position, a door speed, a door acceleration and a door moment; and
   the window adjusting parameter comprises: a window position, a window speed, a window acceleration and a window moment.

4. The method according to claim 3, further comprising the step of changing the door adjusting parameter if the window position falls within a window position range and if the door position falls within a door position range.

5. The method according to claim 4, wherein changing of the door adjusting parameter comprises at least one of changing the door speed, reversing the door direction, and reducing the door moment.

6. The method according to claim 3, further comprising the step of changing the window adjusting parameter if the door position falls within a door position range and if the window position falls within a window position range.

7. The method according to claim 6, wherein changing of the window adjusting parameter comprises at least one of changing the window speed, reversing the window direction, and reducing the window moment.

8. A system of controlling at least one of door adjusting parameters of a driven motor vehicle sliding door and for controlling at least one of window adjusting parameters of a traveling window pane of the motor vehicle sliding door, the system comprising:
   means for determining at least one of the door adjusting parameters,
   means for determining at least one of the window adjusting parameters, and
   means for performing at least one of the following method steps:
      means for controlling at least one of the door adjusting parameters in dependence of the at least one of the determined window adjusting parameters, and
      means for controlling at least one of the window adjusting parameters in dependence of the at least one of the determined door adjusting parameters.

9. A control system for motor vehicle sliding door, comprising:
   a sliding door control electronics for a sliding door actuation device for the actuation of a motion of the sliding door along a door adjusting range,
   a window lifter control electronics for a window lifter system facing the sliding door with a window pane for the motive actuation of a motion of the window pane along a window adjusting range, and
   a sensor system for the detection of obstacles in the window adjusting range and in the door adjusting range, and
   wherein the control system modifies at least one of:
      the motion of the sliding door after the detection of an obstacle in the window adjusting range, and
      the motion of the window pane after the detection of an obstacle in the adjusting door range.

10. The control system according to claim 9, wherein:
   the sensor system comprises a B sensor device arranged for detecting an obstacle in the door adjusting range in the area between the sliding door and a B-column (B) of a motor vehicle; and
   a C-sensor is arranged for the detection of an obstacle in the door adjusting range in the area between the sliding door and a C-column of a motor vehicle.

11. The control system according to claim 10, wherein at least one of the B sensor and C sensor is arranged for detecting obstacle within the window movement.

12. The control system according to claim 9, further comprising a B-C sensor arranged for detecting an obstacle in the door adjusting range in the area between the sliding door and a B-column (B) of a motor vehicle and further arranged for the detection of an obstacle in the door adjusting range in the area between the sliding door and a C-column of a motor vehicle.

13. The control system according to one claim 9, wherein the sensor system comprises at least one field-dependant sensor.

14. The control system according to claim 9, wherein the sensor system is arranged such that at least a B-column section in the area between sliding door and B-column of a motor vehicle and a C-column section between the sliding door and C-column of the motor vehicle to differentiate as detection areas of an obstacle.

* * * * *